United States Patent

[11] 3,626,181

| [72] | Inventor | Roger F. Wernlund<br>Lake Worth, Fla. |
|---|---|---|
| [21] | Appl. No. | 798,399 |
| [22] | Filed | Feb. 11, 1969 |
| [45] | Patented | Dec. 7, 1971 |
| [73] | Assignee | Franklin GNO Corporation<br>West Palm Beach, Fla. |

[54] GAS DETECTING APPARATUS WITH MEANS TO RECORD DETECTION SIGNALS IN SUPERPOSITION FOR IMPROVED SIGNAL-TO-NOISE RATIOS
16 Claims, 3 Drawing Figs.

[52] U.S. Cl. .................................................. 250/41.9 TF,
250/41.9 G, 250/41.9 D
[51] Int. Cl. ............................................ H01j 39/34,
B01d 59/44
[50] Field of Search .......................................... 250/41.91,
41.9 R

[56] References Cited
UNITED STATES PATENTS

| 2,387,550 | 10/1945 | Winkler.......................... | 250/41.91 |
|---|---|---|---|
| 2,685,027 | 7/1954 | Alvarez.......................... | 250/83.3 |
| 2,810,075 | 10/1957 | Hall et al. ...................... | 250/41.91 |
| 2,881,325 | 4/1959 | Hendee et al.................. | 250/83.3 |
| 2,950,387 | 8/1960 | Brubaker........................ | 250/41.91 |
| 2,380,439 | 7/1945 | Hoskins.......................... | 250/41.9 |
| 3,211,996 | 10/1965 | Fox ................................. | 250/41.9 |
| 3,254,209 | 5/1966 | Fite ................................. | 250/41.9 |

FOREIGN PATENTS

| 1,147,651 | 4/1969 | Great Britain................ | 250/41.91 |
|---|---|---|---|

*Primary Examiner*—James W. Lawrence
*Assistant Examiner*—C. E. Church
*Attorney*—Raphael Semmes

ABSTRACT: Ions produced from a gaseous sample, including ions of trace gases to be detected, are separated in a drift cell in accordance with their velocity in an electric drift field and produce output currents which vary as a function of real time. In one embodiment a passive grid shields the output circuit from ion displacement currents, and the output signals are recorded on a continuous loop magnetic tape recorder synchronized with the production of the ions. In another embodiment an active shutter grid ion gate is opened at a predetermined time after the production of the ions and passes all ions with velocity less than a predetermined value to the output circuit. A square wave generator produces asymmetrical square waves for operating the shutter grid and a pulsed ionizer. The output signals are amplified by an electrometer amplifier, and output signals produced for different opening times of the shutter grid may be compared to produce a difference signal.

PATENTED DEC 7 1971 3,626,181

INVENTOR
ROGER F. WERNLUND

BY Raphael Semmes

ATTORNEY

GAS DETECTING APPARATUS WITH MEANS TO RECORD DETECTION SIGNALS IN SUPERPOSITION FOR IMPROVED SIGNAL-TO-NOISE RATIOS

BACKGROUND OF THE INVENTION

This invention relates to apparatus and methods of ion detection and classification and more particularly is concerned with the production of signals by ions separated in accordance with their velocity in a drift field and with the recording of such signals so that the ion current waveform in terms of real time may be observed.

The copending application of Martin J. Cohen, David I. Carroll, Roger F. Wernlund, and Wallace D. Kilpatrick, Ser. No. 777,964, filed Oct. 23, 1968 and entitled "Apparatus and Methods for Separating, Concentrating, Detecting and Measuring Trace Gases," discloses "Plasma Chromatography" systems involving the formation of primary or reactant ions and reaction of the primary ions with molecules of trace substances to form secondary or product ions, which may be concentrated, separated, detected, and measured by virtue of the difference of the velocity or mobility of the ions in an electric field. The primary ions may be produced by subjecting the molecules of a suitable host gas, such as air, to ionizing radiation, for example. The primary ions are then subjected to an electric drift field, causing them to migrate in a predetermined direction through a reaction space into which the sample or trace gas is introduced. The resultant collisions between the primary ions and the trace gas molecules produce secondary ions of the trace gas in much greater numbers than can be produced by mere electron attachment, for example, to trace gas molecules. The secondary ions are also subjected to the electric drift field and may be sorted in accordance with their velocity or mobility. The pressure within the drift cell is maintained high enough (preferably atmospheric) to ensure that the length of the mean free path of the ions in the cell is very much smaller than the dimensions of the cell. A specific system of the copending application employs a pair of successively arranged ion shutter grids or gates for segregating the ion species in accordance with their drift time. The opening of the first grid is timed to pass a group of ions, which may comprise unreacted primary ions as well as secondary ions, and the opening of the second gate is timed to pass a portion of the group to an ion detection means. As further set forth in the said copending application, a pulsed ionizing means, such as a source of pulsed ultraviolet light, may be utilized as a timed reference instead of the first shutter grid. Drift cells without shutter grids are also known.

BRIEF DESCRIPTION OF THE INVENTION

The present invention is concerned with the production and recording of output signal currents from drift cells, which vary as a function of real time, and it is accordingly a principal object of the invention to provide improved apparatus and methods of this type.

Briefly stated, preferred embodiments of the apparatus and methods of the present invention are concerned with ions of substances to be detected that are formed and segregated in a drift field. The ions drift toward an output electrode which is preceded by a grid of the passive or active type. In one embodiment, employing a passive grid, the output current is recorded on a continuous loop magnetic tape recorder synchronized with the operation of a pulsed ionizer. In another embodiment, employing an active grid, the opening and closing of the grid are controlled by a square wave generator which also controls the pulsing of an ionizer. Output signals in this embodiment are amplified by an electrometer amplifier before being indicated. The active grid is opened to pass all ions having a velocity less than a predetermined value, which may be varied. Output signals produced when the value is varied may be compared to produce a difference signal.

BRIEF DESCRIPTION OF THE DRAWING

The invention will be further described in conjunction with the accompanying drawing, which illustrates typical apparatus of the invention, and wherein.

DETAILED DESCRIPTION OF THE INVENTION

Figure 1:
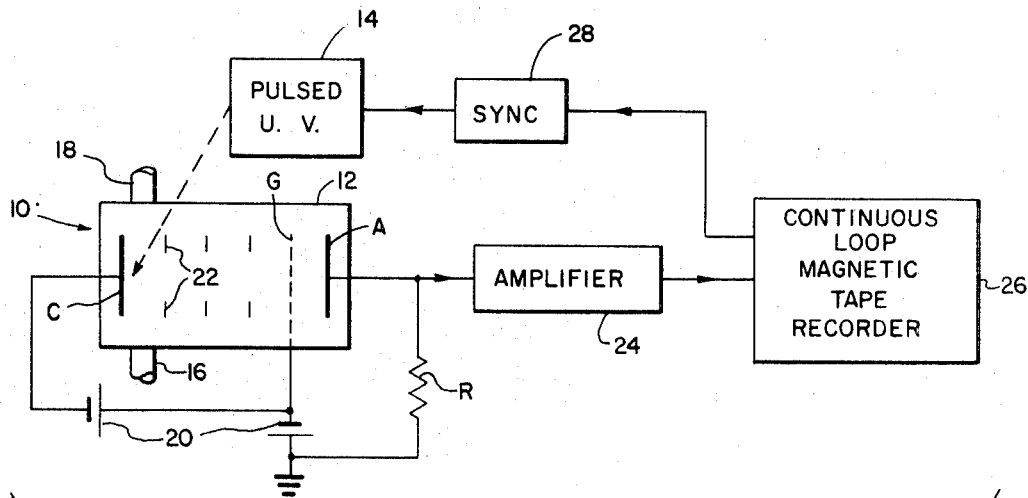
FIG. 1 is a combined block and schematic diagram of a first form of the invention.

Referring to FIG. 1, apparatus in accordance with the invention may comprise a drift cell 10 having an envelope 12 enclosing a series of electrodes, which may be of parallel plane geometry, for example. Principle electrodes C and A are spaced apart in the envelope and may be located adjacent to opposite ends of the envelope. When the apparatus is used to detect negative ions, electrode C will be a cathode and electrode A an anode. When the apparatus is used to detect positive ions, The polarities will be reversed. Associated with electrode C is an ionizing means such as a pulsed source 14 of ultraviolet light directed upon electrode C, which may be highly polished and gold-plated. Other types of ionizers may also be employed.

A passive grid G is disposed adjacent to electrode A between electrodes C and A. The space between grid G and electrode A may be equal to several grid wire spacings of the grid, which may be composed of parallel wires a fraction of a centimeter apart. The total space between electrodes C and A may be of the order of several centimeters. Grid G shields the anode A and the external circuitry connected thereto from ion displacement currents. Inlet tube 16 and outlet tube 18 permit an ionizable gaseous sample containing a substance to be detected to be introduced to and removed from the envelope 12. Any source of gaseous pressure, such as a suitable pump, may be employed to move the sample.

An electric drift field is provided between the principal electrodes C and A. As described in the aforesaid copending application, the source of the drift field may be a chain of batteries 20 connected between electrode C and ground. If negative ions are to be detected, for example, the negative end of the battery chain will be connected to cathode C and the positive end to ground. Anode A may be connected to ground through an impedance such as the output resistor R. Alternatively, a resistor chain voltage divider may be employed in conjunction with a battery connected across the chain to produce the drift field. A series of guard rings 22 spaced along the envelope between electrodes C and A may be provided and connected to the voltage divider chain to maintain the uniformity of the drift field.

Ions produced adjacent to electrode C by the pulsed source 14 drift toward electrode A under the influence of the drift field. Grid G is at AC ground and is always maintained open to the passage of ions by the DC potential applied thereto from the voltage divider chain. The ions which pass through the grid G and impinge upon electrode A produce an output current which developes a voltage across resistor R. The ions which have not reached the grid do not produce such a current, but eventually all of the ions pass through the grid. The faster ions pass through sooner and are collected sooner. The slower ions pass through and are collected at a later time.

The output current is an audio signal which can be passed by a high-gain amplifier 24 with a bandwidth of about 20 to about 20,000 cycles per second. With sufficient initial current, the output signal can be observed several ways. For example, the output signal may be applied to an oscilloscope, and a camera may be employed to photograph and record the displayed signals. A light beam recording oscillograph may also be used to record the output signal. To improve the signal-to-noise ratio of the recorder output signal integration techniques may be employed. Such techniques may include a storage oscilloscope, a Waveform Eductor, an Enhancetron, an analogsto-digital converter in conjunction with a multichannel analyzer, or a computer. FIG. 1 illustrates a preferred form of system for improving the signal-to-noise ratio, which employs a continuous loop magnetic tape recorder 26. The output of amplifier 24 is applied to the recording head of recorder 26. By synchronizing the operation of the pulsed source 14 with the tape recorder, through a synchronizing coupling generally designated by reference numeral 28, the ionizing cycle commencing with the production of a pulse from source 14 can be exactly synchronized with the passage of the beginning of the tape loop by the recording head, so that the output signal following each pulse of ultraviolet light will be recorded upon the loop in precisely the same position, and consecutive output signals will be superimposed.

The ions produced from the sample in envelope 12 become bunched in accordance with their velocity in the drift field as they drift between electrodes C and A. The output current is therefore a series of peaks as a function of time, each peak representing a species of ions. As set forth in the aforesaid copending application, the ions of a substance which it is desired to detect may be formed as secondary ions by ion-molecule reactions involving molecules of the substance to be detected and primary ions formed from a host gas preferentially, or they may be formed directly, as by electron attachment. The ion population is effectively sampled over a distance equivalent to the grid-to-anode spacing. This sampling results in an effective time constant equal to the ion transit time between the grid and anode. The overall response time of the grid-anode space and the output circuitry should be about 2 percent of the ion transit time in order to achieve high resolution.

Figure 2:
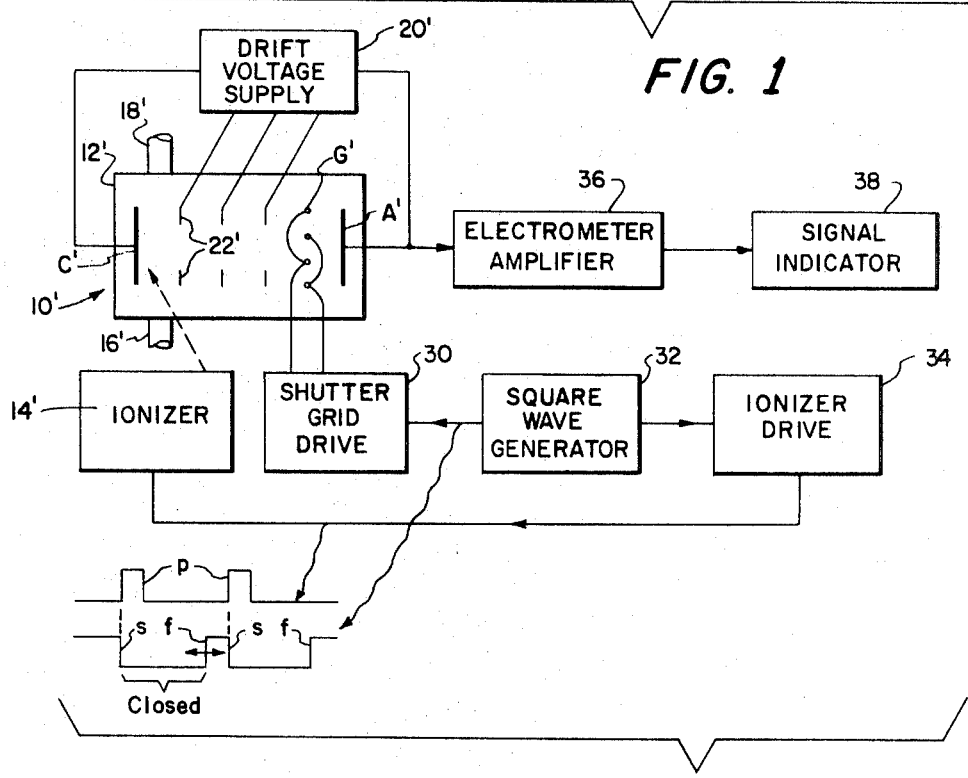
FIG. 2 is a similar diagram of a second form of the invention and also illustrates certain waveforms.

FIG. 2 illustrates a different embodiment of the invention, in which the passive grid G is replaced by an active grid G' of the type set forth in the aforesaid copending application. Primed reference characters designate parts corresponding to those illustrated in FIG. 1. Shutter grid G' is of a type known in the drift cell art, and, as described in the aforesaid copending application, comprises two sets of interdigitated parallel wires, alternate wires being connected together to form the two sets. Adjacent elements of the shutter grid are normally maintained at equal and opposite potentials relative to a grid average potential established by the drift voltage supply. Under these conditions the shutter grid is closed to the passage of electrically charged particles. At predetermined times all of the elements of the grid are driven to the same potential, the grid average potential, by the use of suitable grid drive circuit 30, thereby opening the grid for the passage of ions. Each set of grid wires may be connected by a resistor (not shown) to a tap on the drift voltage supply, the grid average potential being positive relative to the cathode potential when negative ions are to be detected, but less positive than the anode. The potential sources which maintain the sets of grid wires at equal and opposite potentials relative to the grid average potential may be incorporated in the grid drive circuit 30.

In accordance with the invention, a square wave generator 32 is employed to operate the grid drive circuit 30 and the ionizer drive circuit 34 in a predetermined manner. The square wave generator is free running with an asymmetrical but repetitive waveform. The total waveform period is constant, and the start of the period initiates the ionizer drive. The start of the period shown on the waveform diagram of FIG. 2 at $s$ produces a pulse of $p$ of fixed duration for operating the ionizer 14'. The finish, $f$ of the square waveform commenced at $s$ may be fixed or variable in time. During the interval from $s$ to $f$ the shutter grid G' is closed. During the interval from $f$ to $s$ the shutter grid is open. Thus, the shutter grid opens at a time delayed relative to the preceding pulse $p$ and remains open until the next pulse $p$.

The ions produced in the drift cell 10' in response to each pulse $p$ drift toward the electrode A' during the interval between that pulse and the next pulse $p$ and become bunched in accordance with their drift velocity. When the ion gate G' is opened, at time $f$, it remains open until the next pulse $p$. Thus, all ions of drift velocity less than a predetermined value will be passed to the anode A' and will produce an output current. The output current is applied to an electrometer amplifier 36, the bandwidth of which may be from DC to 20 cycles per second. The output of the amplifier is connected to a signal indicator 38, such as an X-Y recorder, the output of the amplifier producing the Y signal, and the X signal being synchronized with the opening of the shutter grid.

Figure 3:
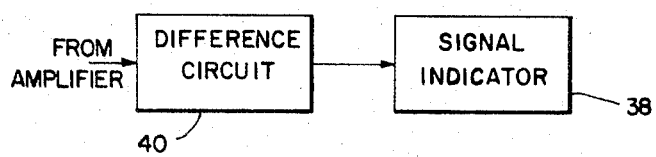
FIG. 3 is a partial block diagram of a modification of the apparatus of FIG. 2.

If the shift from closed to open condition of the ion gate is varied in time, it is possible to take the difference between the output current at two different delays (relative to pulses $p$) to obtain the output for a particular delay interval. Thus, as shown in FIG. 3, if the output of the electrometer amplifier is applied to a difference circuit 40, which compares the output signals (with whatever storage is necessary) for two different opening times of the ion gate relative to the operation of the ionizer, a difference signal can be produced and applied to the signal indicator 38. The recorder signal will therefore represent the output current during a chosen interval.

While preferred embodiments of the invention have been shown and described, it will be apparent to those skilled in the art that changes can be made in these embodiments without departing from the principles and spirit of the invention, the scope of which is defined in the appended claims.

The invention claimed is:

1. Apparatus for detecting a substance in a gaseous sample, which comprises an envelope having a pair of principal electrodes spaced apart therein, means for introducing a gaseous sample into said envelope, means associated with one of said electrodes for producing ions from molecules of said sample by ion-molecule reactions, means for applying a drift field between said electrodes to cause said ions to drift toward the other of said electrodes, grid means between said electrodes adjacent to said other electrode, means for applying a potential to said grid means which permits substantially all of said ions to pass through said grid means to said other electrode, the length of the mean free path of said ions in said envelope being very much smaller than the dimensions of said envelope, means for sensing the presence of ions passed between said grid means and said other electrode and for generating electrical signals in response thereto, means for discriminating between ions of different mass represented by said electrical signals and means for providing the ions at said grid means in timed cycles, said discriminating means including means for producing indications dependent upon the timing of said electrical signals with respect to the beginning of the corresponding cycle.

2. Apparatus in accordance with claim 1, said sensing means comprising an output circuit connected to said other electrode.

3. Apparatus in accordance with claim 2, wherein said output circuit includes an impedance across which a potential is developed in accordance with said signals.

4. Apparatus in accordance with claim 3, said sensing means further comprising an amplifier connected to said impedance for amplifying the voltage developed across said impedance.

5. Apparatus in accordance with claim 4, said discriminating means comprising a continuous loop magnetic tape recorder having means for recording the output of said amplifier on said continuous loop repetitively such that signals representing ions of the same mass are recorded in coincidence so as to reinforce one another.

6. Apparatus in accordance with claim 5, wherein said ion-producing means has means synchronized with the operation of said recorder for rendering the ion-producing means operative periodically.

7. Apparatus for detecting a substance in a gaseous sample, which comprises an envelope, a pair of principal electrodes spaced apart in said envelope, means for introducing a gaseous sample into said envelope, means including an ionizer associated with one of said principal electrodes for producing reactant ions which react with molecules of said substance to produce product ions, means for applying a drift field between said electrodes to cause said ions to drift toward the other of said electrodes, an output circuit connected to said other electrode, shielding means disposed between said electrodes adjacent to said other electrode for shielding said other electrode and said output circuit from ion displacement currents in said envelope but for permitting substantially all of said ions to pass through said shielding means to said other electrode, the length of the mean free path of said ions in said envelope being very much smaller than the dimensions of said envelope, said output circuit including means for sensing the presence of ions passed between said shielding means and said other electrode and for generating electrical signals in response thereto, and means for discriminating between ions of different mass represented by said electrical signals, said apparatus including means for providing the ions at said shielding means in timed cycles, said discriminating means including means for producing indications dependent upon the timing of said electrical signals with respect to the beginning of the corresponding cycle.

8. Apparatus for detecting a substance in a gaseous sample, which comprises an envelope, a pair of principle electrodes spaced apart in said envelope, means for introducing a gaseous sample into said envelope, ionizing means associated with one of said electrodes for producing ions from said sample, an output circuit connected to the other of said electrodes, means for applying a drift field between said electrodes to cause said ions to drift toward said other electrode said output circuit including means for sensing the presence of ions and for generating electrical signals in response thereto, and a continuous-loop-medium recorder having means for recording on said medium a signal derived from said output circuit repetitively in superposition such that signals representing ions of the same mass are recorded in coincidence so as to reinforce one another.

9. Apparatus in accordance with claim 8, wherein said medium is a magnetic tape.

10. Apparatus in accordance with claim 8, wherein said ionizing means has means for rendering it operative periodically in synchronism with the operation of said recorder.

11. Apparatus for detecting a substance in a gaseous sample, which comprises an envelope, a pair of principle electrodes spaced apart in said envelope, means for introducing a gaseous sample into said envelope, means for applying a drift field between said electrodes, cyclically operable ionizing means associated with one of said electrodes for producing reactant ions which react with molecules of said substance to produce product ions, an output circuit connected to the other of said electrodes, ion gate means disposed between said electrodes adjacent to said other electrode, means for operating said ionizing means cyclically, and means for opening said ion gate means at a predetermined time after said ionizing means has operated and for closing said ion gate means when said ionizing means is operated again, the length of the mean free path of said ions in said envelope being very much smaller than the dimensions of said envelope, said output circuit including means for sensing the presence of ions and for generating electrical signals in response thereto.

12. Apparatus in accordance with claim 11, wherein said means for opening and closing said gate means comprises a square wave generator, and wherein said means for operating said ionizing means comprises means synchronized with said square wave generator.

13. Apparatus in accordance with claim 11, said output circuit comprising an electrometer amplifier and signal indicating means connected to said electrometer amplifier.

14. Apparatus in accordance with claim 11, wherein said means for opening and closing said gate means includes means for varying the time at which said gate means is opened relative to the preceding operation of said ionizing means.

15. Apparatus in accordance with claim 14, further comprising means for comparing the signals produced in said output circuit when said gate means is opened at different times and for producing a difference signal.

16. A method of detecting a substance in a gaseous sample, which comprises repetitively producing ions from said sample, repetitively separating said ions in accordance with their velocity in a drift field, repetitively producing electric signals in accordance with the separated ions, and recording said signals in superposition upon a continuous loop medium such that signals representing ions of the same mass are recorded in coincidence so as to reinforce one another.

* * * * *